United States Patent
Stephens et al.

(10) Patent No.: US 9,331,919 B2
(45) Date of Patent: *May 3, 2016

(54) METHOD FOR SUMMARIZING FLOW INFORMATION OF NETWORK DEVICES

(75) Inventors: Josh Stephens, Austin, TX (US); Joel Dolisy, Austin, TX (US)

(73) Assignee: SOLARWINDS WORLDWIDE, LLC, Austin, TX (US)

( * ) Notice: Subject to any disclaimer, the term of this patent is extended or adjusted under 35 U.S.C. 154(b) by 2159 days.

This patent is subject to a terminal disclaimer.

(21) Appl. No.: 11/987,561

(22) Filed: Nov. 30, 2007

(65) Prior Publication Data

US 2009/0144304 A1 Jun. 4, 2009

(51) Int. Cl.
*G06F 15/173* (2006.01)
*H04L 12/26* (2006.01)
*H04L 12/24* (2006.01)

(52) U.S. Cl.
CPC ............ *H04L 43/062* (2013.01); *H04L 43/022* (2013.01); *H04L 43/026* (2013.01); *H04L 41/0213* (2013.01)

(58) Field of Classification Search
USPC ......................................................... 709/224
See application file for complete search history.

(56) References Cited

U.S. PATENT DOCUMENTS

| | | | |
|---|---|---|---|
| 6,405,251 B1 * | 6/2002 | Bullard et al. ................. | 709/224 |
| 6,546,420 B1 * | 4/2003 | Lemler ................. | H04L 43/026 709/224 |
| 6,625,657 B1 * | 9/2003 | Bullard ......................... | 709/237 |
| 6,751,663 B1 * | 6/2004 | Farrell et al. .................. | 709/224 |
| 7,076,547 B1 * | 7/2006 | Black ............................ | 709/224 |
| 7,167,860 B1 * | 1/2007 | Black et al. .................... | 709/224 |
| 7,188,128 B1 * | 3/2007 | Nagaraj et al. | |
| 7,243,143 B1 * | 7/2007 | Bullard ......................... | 709/223 |
| 7,385,924 B1 | 6/2008 | Riddle | |
| 7,508,764 B2 | 3/2009 | Back et al. | |
| 7,587,513 B1 * | 9/2009 | Maturi et al. ................ | 709/224 |
| 7,660,892 B2 | 2/2010 | Choong et al. | |
| 7,929,534 B2 * | 4/2011 | Poletto et al. ................. | 370/392 |
| 2001/0021176 A1 | 9/2001 | Mimura et al. | |
| 2002/0019875 A1 | 2/2002 | Garrett et al. | |
| 2002/0188710 A1 * | 12/2002 | Duffield et al. .............. | 709/223 |
| 2003/0110252 A1 * | 6/2003 | Yang-Huffman ............ | 709/223 |
| 2004/0030927 A1 | 2/2004 | Zuk | |
| 2004/0267945 A1 | 12/2004 | Reiss | |
| 2005/0039104 A1 | 2/2005 | Shah et al. | |
| 2005/0286423 A1 | 12/2005 | Poletto et al. | |
| 2006/0089985 A1 * | 4/2006 | Poletto ......................... | 709/224 |
| 2006/0168168 A1 * | 7/2006 | Xia et al. ...................... | 709/223 |

(Continued)

OTHER PUBLICATIONS

Non-Final Office Action, dated May 13, 2010, in U.S. Appl. No. 11/987,560.

(Continued)

*Primary Examiner* — Joshua Joo
(74) *Attorney, Agent, or Firm* — Squire Patton Boggs (US) LLP

(57) ABSTRACT

A method for organizing network flow information within a relational database relates to minimizing contention for the network flow information. In particular, data is generally aggregated at certain time intervals and separately organized. In this way, contention is decreased as analysis can occur on the separated existing flow records, which are optionally aggregated, while new raw flow records are stored. In another embodiment, the aggregated data can be re-aggregated at second, larger time intervals.

10 Claims, 5 Drawing Sheets

(56) References Cited

U.S. PATENT DOCUMENTS

| | | | |
|---|---|---|---|
| 2006/0242694 A1* | 10/2006 | Gold et al. | 726/13 |
| 2007/0016666 A1* | 1/2007 | Duffield et al. | 709/223 |
| 2007/0019548 A1* | 1/2007 | Krishnamurthy | 370/232 |
| 2007/0150497 A1 | 6/2007 | De La Cruz et al. | |
| 2007/0201359 A1 | 8/2007 | Matsubara et al. | |
| 2007/0226802 A1* | 9/2007 | Gopalan et al. | 726/24 |
| 2008/0043636 A1* | 2/2008 | Duffield et al. | 370/252 |
| 2008/0263188 A1* | 10/2008 | Awduche et al. | 709/223 |
| 2008/0291915 A1 | 11/2008 | Foschiano | |
| 2009/0016236 A1* | 1/2009 | Alcala et al. | 370/253 |
| 2011/0013636 A1* | 1/2011 | Rowell | H04L 43/026 370/395.1 |
| 2012/0207024 A1* | 8/2012 | Kohn | H04L 43/026 370/235 |

OTHER PUBLICATIONS

Non-Final Office Action, dated Feb. 5, 2010, in U.S. Appl. No. 11/987,562.
Non-Final Office Action, dated Oct. 27, 2010, in U.S. Appl. No. 11/987,560.
Non-Final Office Action, dated Nov. 15, 2010 in U.S. Appl. No. 11/987,562.
Joel Dolisy, "Method for Partitioning Network Flows Based on Their Time Information", Non-final Office Action, Notification Date Apr. 15, 2011, U.S. Appl. No. 11/987,560.
Final Office Action, dated Sep. 29, 2011, in U.S. Appl. No. 11/987,560.
Notice of Allowance, dated Jan. 19, 2011; Issued in corresponding U.S. Appl. No. 11/987,560.

* cited by examiner

METHOD FOR SUMMARIZING FLOW INFORMATION OF NETWORK DEVICES

FIELD OF THE INVENTION

A method for minimizing contention for stored network flow information within a relational database.

BACKGROUND OF THE INVENTION

Network usage data is useful for many important business functions, such as subscriber billing, marketing & customer care, product development, network operations management, network and systems capacity planning, and security. Network usage data does not include the actual information exchanged in a communications session between parties, but rather includes numerous usage detail records, known as "flow records" containing one or more types of metadata (i.e., "data about data"). Known network flow records protocols include Netflow®, sFlow®, jFlow®, cFlow® and Netstream®. As used herein, a flow record is defined as a small unit of measure of unidirectional network usage by a stream of IP packets that share common source and destination parameters during a time interval.

The types of metadata included within each flow record vary based on the type of service and network involved and, in some cases, based on the particular network device providing the flow records. In general, a flow record provides detailed usage information about a particular event or communications connection between parties, such as the connection start time and stop time, source (or originator) of the data being transported, the destination or receiver of the data, and the amount of data transferred. A flow record summarizes usage information for very short periods of time (from milliseconds to seconds, occasionally minutes). Depending on the type of service and network involved, a flow record may also include information about the transfer protocol, the type of data transferred, the type of service (ToS) provided, etc. In telephony networks, the flow records that make up the usage information are referred to as call detail records (CDRs).

In network monitoring, the network flow records are collected, stored and analyzed to produce meaningful result. Network usage analysis systems process these flow records and generate reports or summarized data files that support various business functions. Network usage analysis systems provide information about how a network services are being used and by whom. Network usage analysis systems can also be used to identify (or predict) customer satisfaction-related issues, such as those caused by network congestion and network security abuse. In one example, network utilization and performance, as a function of subscriber usage behaviour, may be monitored to track a user's experience, to forecast future network capacity, or to identify usage behavior indicative of network abuse, fraud and theft.

As networks become larger and as more tasks are performed within the networks, such as transferring conventional telephone communications to Voice over IP (VoIP), the network flow on the data transactions can be voluminous and will quickly exceed storage and processing capacities.

In response to this problem of the large volume of the collected network flow information, one known solution uses sampling techniques to decrease data flow volume. Different sampling methods can be used by the network device to collect the information. Sampling can be done at the packet level or the flow level, and can be random or deterministic. Depending on which type of sampling method used, the effect will apply to CPU/memory utilization on the network device and/or bandwidth usage to export flow information to the collector. While the sampling may reduce the overall volume of collected network flow information, the total amount of data is often still voluminous. Furthermore, sampling does not address other problems within current network monitoring methodologies. For example, sampling techniques may not provide a proper picture of the network traffic, since data is being ignored in the sampling process.

For example, another problem with current network monitoring methodologies is a contention in storage resources when trying to access the stored network flow information as additional network flow information is regularly being added. Typically, as network flow data is being accessed for analysis, new network flow information cannot be stored. Likewise, as new network flow information is in the process of being stored, the existing network flow data typically cannot be accessed.

SUMMARY OF THE INVENTION

In response to these and other needs, embodiments of the present invention relate to a method for aggregating network flow information within a relational database by minimizing the number of database objects required for the aggregation. In particular, data is generally aggregated at certain time intervals and separately organized. In this way, contention is decreased as analysis can occur on the aggregated flow records, while new flow records are stored. In another embodiment, the aggregated data can be re-aggregated at a second, larger time interval.

In one embodiment of the present invention, a system for aggregating network flow information is disclosed. The system includes a storage system, the storage system comprising a raw data table containing raw flow record data for a current time period and a first aggregated data table containing first aggregated flow record data for a first prior time period. The storage system optionally includes a second aggregated data table containing second aggregated flow record data for a second prior time period. Optionally, the first period and said second period do not overlap. The first and second periods are of equal duration. Alternatively, the first period has a first duration, and the second period has a second, relatively greater duration. In another embodiment, the system further includes a flow generating device and a data analysis device, whereby the flow generating device is configured to concurrently provide new flow records to the raw data table as the data analysis device accesses said first aggregated data table. The system of may also include an archival storage system that is configured store raw flow record data for the first prior time period.

In another embodiment, a method for aggregating network data flows is provided. The method includes the steps of during a first period of time, storing first flow records in a first table, and after the first period of time and during a second period of time, creating a second table, storing second flow records in the second table, and aggregating said first flow records in said first table. The method may further include the steps of, after the second period of time and during a third period of time, creating a third table; and storing third flow records in the third table and aggregating said second flow records in said second table. Alternatively, the method of may include aggregating the first flow records and said second flow records in said first table. Optionally, the first period and said second period do not overlap. Either the first period and said second period are of equal duration, or the first period is relatively longer than said second period. Optionally, the steps of storing second flow records in the second table and aggregating said first flow records in said first table occur concurrently. The method of may further include the steps of archiving the first flow records and said second flow records; and compressing said archived first and second flow records. The method may also include the step of sampling said first flow records prior to the aggregating the first flow records in the first table.

In another embodiment, the present invention includes a system for aggregating network flow information. The system includes a flow data generating device such as a router configured forward the flow data to a storage system to create new flow records, a storage system configured to store first flow records and to store aggregated flow records corresponding to second flow records, wherein each of said first flow records has a time stamp within a first predefined range and each of said second flow records has a time stamp outside of said first predefined range, and a data analysis device configured to access the storage system. In this embodiment, the flow generating device and said data analysis device are configured to access the storage system concurrently. Optionally, the storage system includes a first data table containing first flow record data and a second data table containing said aggregated second flow record. Optionally, in this system, the second data table includes multiple sub-tables, wherein each of said sub-tables is associated with a time period, and each of said sub-tables includes one or more of the aggregated second flow records having a time stamp corresponding to the time period. Optionally, the system may further includes an archival storage system that is configured to receive and store said first flow records and said second flow records.

BRIEF DESCRIPTION OF THE DRAWINGS

The above and other objects, features and advantages of certain exemplary embodiments of the present invention will be more apparent from the following detailed description taken in conjunction with the accompanying drawings in which.

DETAILED DESCRIPTION OF THE PREFERRED EMBODIMENTS

Figure 1:
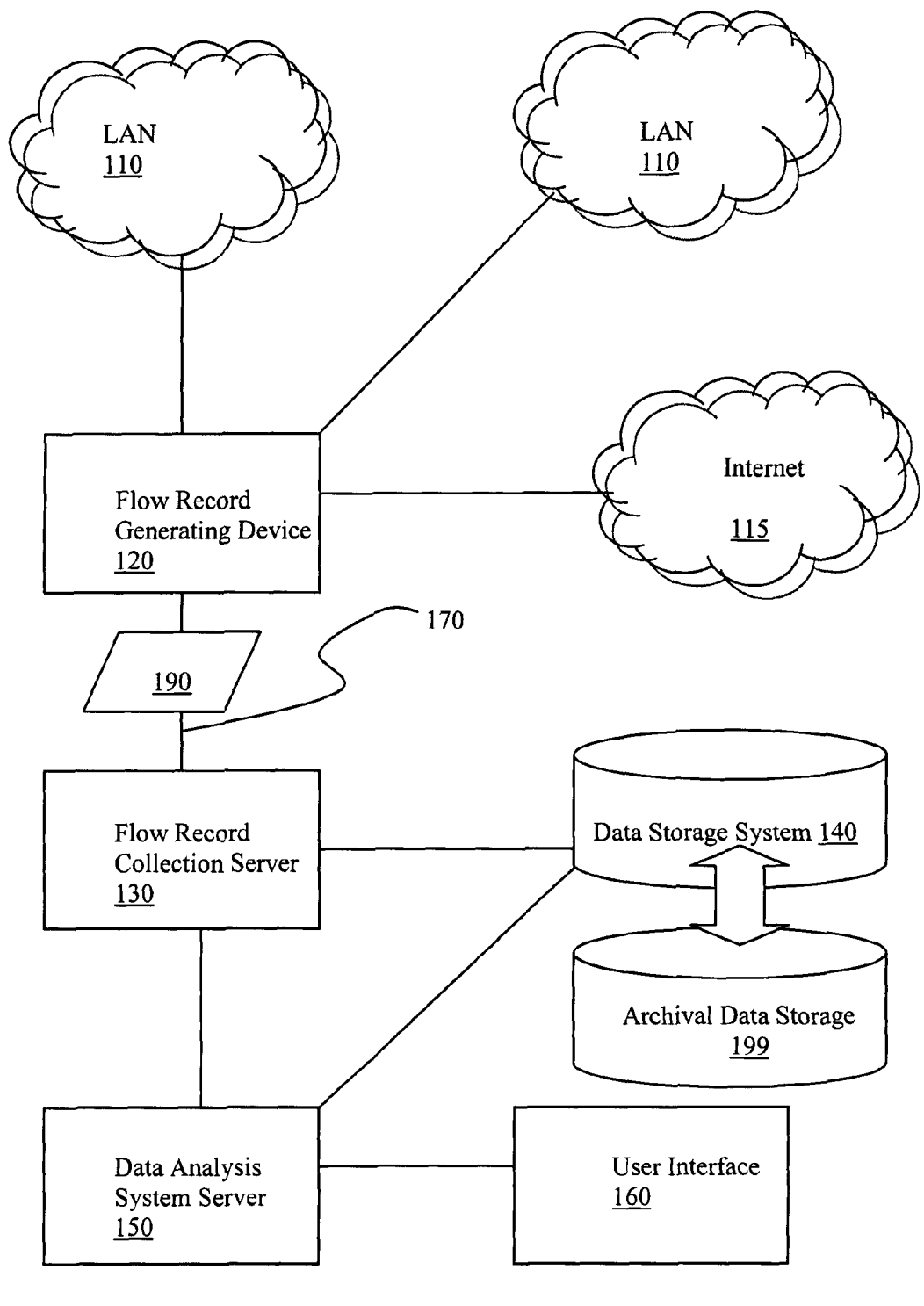
FIG. 1 depicts a flow records analysis system in accordance with embodiments of the present invention.

As shown in FIG. 1, a network usage analysis system 100 includes a data collection system server 130 and a data storage system 140, in one embodiment. The data collection system server 130, also called a listener, is a central server that collects the flow data 190 from all the various network agents 120 for storage and analysis. The data collection system server 130 receives flow records 190 from the flow record generating device 120, which is a network device that is part of an IP network 110. In one embodiment, network 110 includes the Internet 115.

In general, flow record generating devices 120 may include substantially any network device capable of handling raw network traffic at "line speeds" and generating flow records from that traffic. Exemplary flow record generating device 120 include routers, switches and gateways, and in some cases, may include application servers, systems, and network probes. In most cases, the small flow record records generated by flow record generating devices 120 are exported as a stream of flow records 190 to the data collection system server 130.

Various network protocol run on network equipment for collecting network and internet protocol traffic information. Typically, various network agents 120, such as routers, have flow feature enabled to generate flow records. The flow records 190 are typically exported from the network agent 120 in User Datagram Protocol (UDP) or Stream Control Transmission Protocol (SCTP) packets and collected using a flow collector. For more information, please refer to Internet Engineering Task Force (IETF) standard for Internet Protocol Flow Information eXport (IPFIX) at http://www.ietf.org/html.charters/ipfix-charter.html.

As described above, flow records 190 are usually sent by the network agents 120 via UDP or SCTP, and for efficiency reasons, the network agents 120 does not store flow records once they are exported. With a UDP flow, if the flow record 190 is dropped due to network congestion, between the network agent 120 and the data collection server 130, it will be lost forever because there is no way for the network agent 120 to resend the flow record 190. Flow may also be enabled on a per-interface basis to avoid unnecessarily burdening of the router's processor. Thus, the flows records 190 are generally based on the packets input to interfaces where it is enabled to avoid double counting and to save work for the network agent 120. Also, the network agent 120 may export a flow records for dropped packets.

Network flows have been defined in many ways. In one implementation, a flow includes a 5-tuple: a unidirectional sequence of packets to define Source IP address, Destination IP address, Source TCP port, Destination TCP port, and IP protocol. Typically, the network agent 120 will output a flow record 190 when it determines that the flow is finished. The network agent 120 typically does this by "flow aging," where the network agent 120 resets an aging counter when the network agent 120 sees new traffic for an existing flow. Also, TCP session termination in a TCP flow causes the network agent 120 to expire the flow. The network agent 120 can also be configured to output a flow record at a fixed interval even if the flow is still ongoing. Alternatively, an administrator could define flow properties on the network agent 120.

A flow record 190 can contain a wide variety of information about the traffic in a given flow. An exemplary flow record 190 contains the following values, as defined in Table 1:

TABLE 1

Exemplary Flow Record

Flow Version number
Sequence number
Input and output interface SNMP indices
Timestamps for the flow start and finish time
Number of bytes and packets observed in the flow
Layer 3 headers, including Source & destination IP addresses, Source and destination port numbers, IP protocol, and Type of Service (ToS) value
For TCP flows, the union of all TCP flags observed over the life of the flow.

As suggested above, acquiring and storing the flow data can be computationally expensive for the network device and burden the device's processor to the point that the network device is prevented from accomplishing primary tasks related to routing traffic. To reduce problems caused by processor exhaustion in the network agent 120, the above-sampling described sampling techniques, may be used in another embodiment of the present invention. When sampled flows are used, the flow records 190 can be adjusted for the effect of sampling, and various values such as traffic volumes are estimations rather than an actual measured flow volume.

The lack of reliability in the UDP transport mechanism does not significantly affect the accuracy of the measurements obtained from a sampled flow. For example, if flow samples are lost, then new values will be sent when the next polling interval has passed. In this way, the loss of packet flow samples is a slight reduction in the effective sampling rate. When sampling is used, the UDP payload contains the sampled flow datagram. Thus, instead of including an entire flow record 190 each datagram instead provides information such as the flow version, its originating agent's IP address, a sequence number, how many samples it contains and the flow samples.

Continuing with FIG. 1, the data collection system server 130 receives the streaming flow records 190 from flow record generating device 120 via a communication link 170. In one embodiment, the flow record generating device 120 may be included within network 110. In another embodiment, the flow record generating device 120 may be implemented at a location physically apart from, though functionally coupled to, network 110. Though shown in FIG. 1 as separate from the data collection system server 130, flow record generating device 120 may be a part of data analysis system server 130, in another embodiment.

A data analysis system server 150 accesses and uses the flow records 190 to perform predetermined network usage statistical analysis. In general, the data analysis system server 150 implements various statistical model that are defined to solve one or more network usage related problems, such as network congestion, network security abuse, fraud and theft, among others. The data analysis system server 150 uses the flow records 190 and the statistical models to generate a statistical result, which also may be subsequently stored within a data storage system 140. Exemplary embodiments for storing the statistical result will be described in more detail below. By analyzing flow data, the data analysis system server 150 can build a picture of traffic flow and traffic volume in a network.

In one aspect, the data analysis system server 150 may be responsive to a user interface 160 for interactive analysis of the flow records 190. User interface 160 may comprise substantially any input/output device known in the art, such as a keyboard, a mouse, a touch pad, a display screen, etc. In one example, a graphical display of the statistical results may be output to a display screen at user interface 160.

In one embodiment, data analysis system server 150 comprises a computer software program, which is executable on one or more computers or servers for analyzing the network usage data in accordance with various embodiments of the invention. Although the data storage system 140 is shown as external to the data collection system server 130 and/or the data analysis system server 150, the data storage system 140 could be alternatively arranged within either of the servers 130 and 150. Data storage system 140 may comprise substantially any volatile memory (e.g., RAM) and/or non-volatile memory (e.g., a hard disk drive or other persistent storage device) known in the art.

As previously suggested, while the each of the flow records 190 is typically compact, even small sized networks 100 may have a large number of data transactions, thereby creating a large number of the flow records 190 since there are constant data exchanges within the network 100. As a consequence, network usage analysis system 100 may produce and store numerous flow records 190 in the data storage system 140 during a given time period.

Continuing with FIG. 1, in response to these and other needs, embodiments of the present invention aggregate the flow records 190 stored in the data storage system 140 depending on the characteristics of the flow records 190. As described in greater detail below, the aggregation in the data storage system 140 addresses many problems related to the large volume of the flow records 190 and the need to access the existing records 190 while writing new flow records 190. In one embodiment of the present invention, the flow records 190 may also be stored redundantly and entirely in an archival data storage system 199 in which no data aggregation occurs. For example, the flow records 190 may be acquired as needed, even after aggregation in the data storage system 140. The flow records 190 may be forwarded to the archival data storage system 199 concurrently with the delivery of the flow records 190 to the data storage system 140. Alternatively, the data storage system 140 may write the flow records 190 to the archival data storage system 199 as part of the aggregation process. Because the archival data storage system 199 is rarely accessed, the flow records 190 stored within it may be significantly compressed using known techniques while substantially preserving all of the data contained within the flow records 190.

Figure 2:
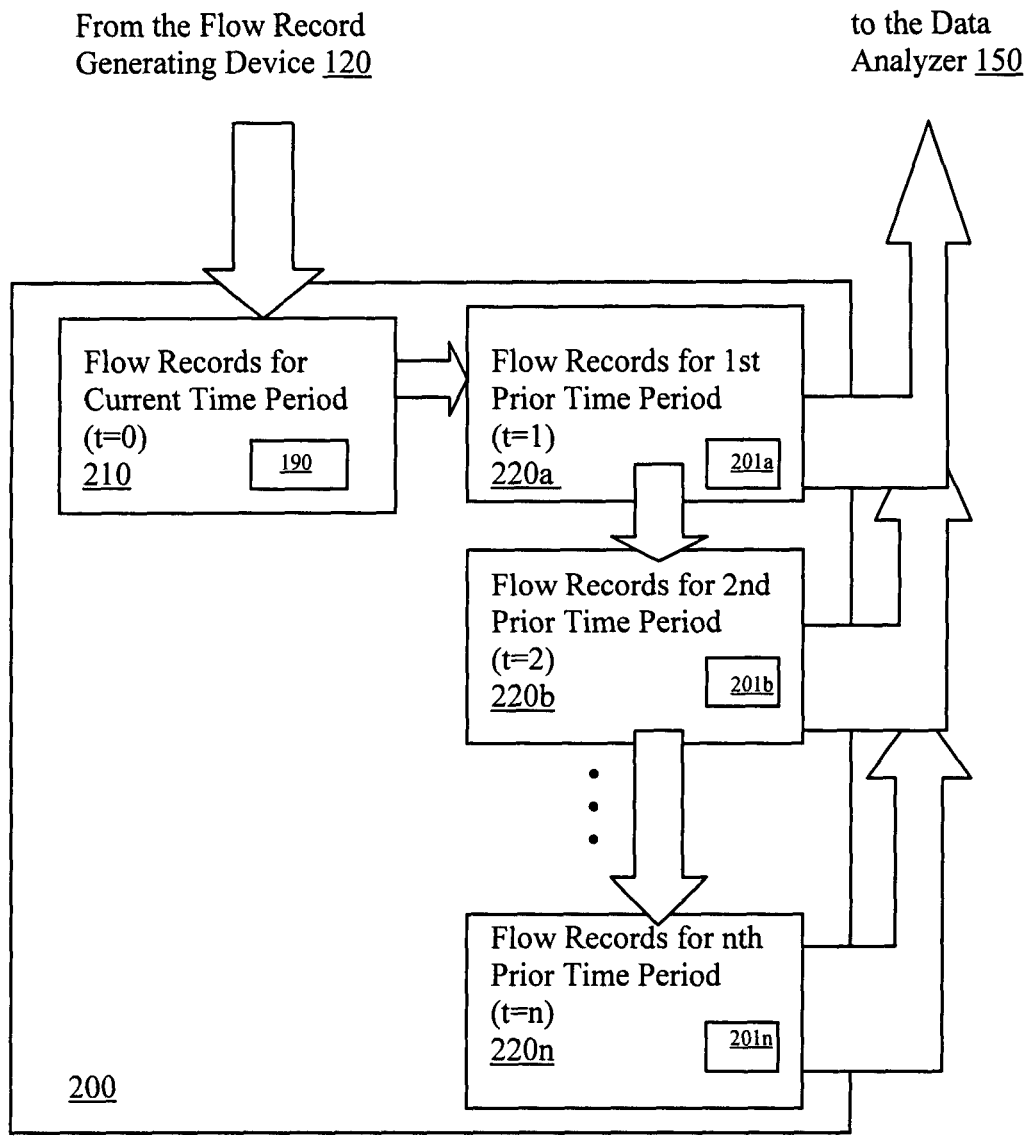
FIGS. 2, 3A-3B, and 4 depict databases for aggregating the flow records in the flow records analysis system of FIG. 1 in accordance with embodiments of the present invention

Referring now to FIG. 2, the data storage system 140 for aggregating the numerous stored flow records 190 in accordance with an embodiment of the present invention is now presented. In particular, the data storage system 140 is typically a standard query language (SQL) database 200 on a storage area network (SAN). The database 200 includes multiple tables 210 and 220a-220n that divide the database 200.

In the depicted embodiment, each of the tables 210, 220a-220n is associated with a different time period, including the current time period and n prior time periods. In the current time period, each of the new flow records 190 is stored in current table 210. When the flow records 190 in the current table 210 ages beyond a predefined threshold, which may be defined according to the storage and access needs of the system 100, the new flow records 190 are aggregated as desired as the aggregated flow data 201a for time period a, and the current table 210 thereby becomes the first aggregated table 220a. A new current table 210 is created using the Data Definition Language (DDL) functions to store the new flow data 190. Likewise, each of the other aggregated tables 220b-220n contains, respectively, aggregated flow data 201b-201n for previous time periods b-n.

In this way, the aggregation generally occurs in the same table as saved, and generally occurs along one or more of the above-described data categories within the flow record. For example, the aggregated may describe all data of a type or protocol transmitted to or from a particular router during the time period a.

Continuing with FIG. 2, it can be seen that the Flow Record Generating Device 120 may forward new flow records 190 in the current table 210. At the same time, the Data Analyzer 150 may access the aggregated data 201a-201n in each of the aggregated tables 220a-220n. In this way, data contention is minimized. Furthermore, because the aggregated data 201a-201n is significantly smaller than the flow records 190, significant storage capacity is freed. Also, the analysis is greatly eased since the aggregated data 201a-201n is significantly smaller.

As described above, each of the tables 220a-220n is associated with a time period. The time period may be unique and fixed, or as described below, the time periods may vary as needed. The time periods of the tables 220a-220n may be used to assign the flow records 190. In particular, as noted above in Table 1, each of the flow records 190 typically has an associated time stamp. The time stamp for a flow record 190 is compared to for the time periods of the aggregated tables 220a-220n to identify an appropriate table.

As described above, the embodiment depicted in FIG. 2 generally describes the periodic and cyclical aggregation and storage of the current flow records for each of n prior time periods. It should be appreciated that the duration of the time periods may be defined as needed to accomplish the goals of the data analysis system 100. For example, data may be aggregated every few minutes, hourly, or daily.

The aggregated data 201a-201n in the aggregated tables 220a-220n may be formed as needed, according to known aggregation techniques. For, one record in the aggregated data 201a for time period 1 may include an aggregated flow describing all communications of a particular type between two nodes during that time period 1. In this way, a separate record may by used for communications between different nodes, or different types of communications (different protocols, QoS, etc.) between the same two nodes.

Figure 3A:
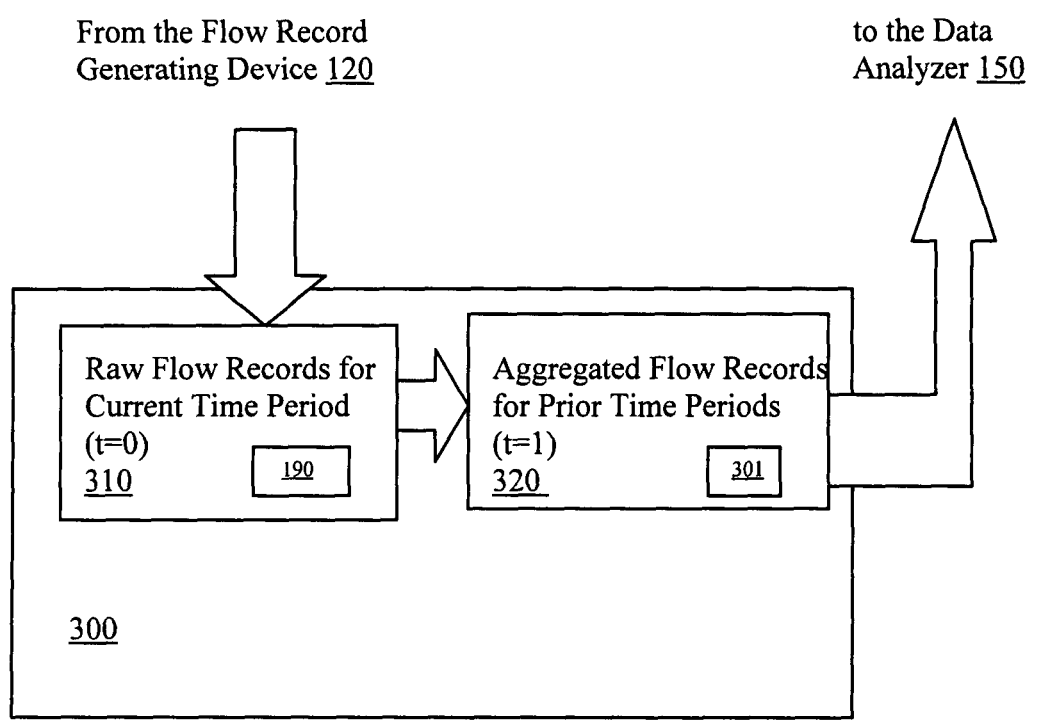

Referring now to FIG. 3A, in another embodiment of the present invention, the data storage system 140 is a database 300. The database 300 includes a current table 310 and aggregated prior table 320 that divide the database 300. In the depicted embodiment of FIG. 3A, the table 310 is used in the current time period to store each of the new flow records 190.

When the flow records 190 in the current table 310 ages beyond a predefined threshold or beyond a predefined range of time, which may be defined according to the storage and access needs of the system 100, the new flow records 190 are aggregated as desired with other existing aggregated flow records to form an aggregated flow data 301. As before, the aggregation generally occurs along one or more of the above-described data categories within the flow record. For example, the aggregated may describe all data of a type or protocol transmitted to or from a particular router during the prior time periods. The current table 310 may store records from the latest time period (such as the last fifteen-minute), whereas the aggregated prior table 320 may store aggregated records from of a longer period, such as the rest of the day. The aggregated prior table 320 is then periodically cleared such as once a day, perhaps after the aggregated data is accessed by the analysis server 150.

Continuing with FIG. 3A, it can be seen that the Flow Record Generating Device 120 may forward new flow records 190 in the current table 310. At the same time, the Data Analyzer 150 may access the aggregated data 301 in the aggregated tables 320. Again, data contention is minimized and storage capacity is preserved.

Figure 3B:
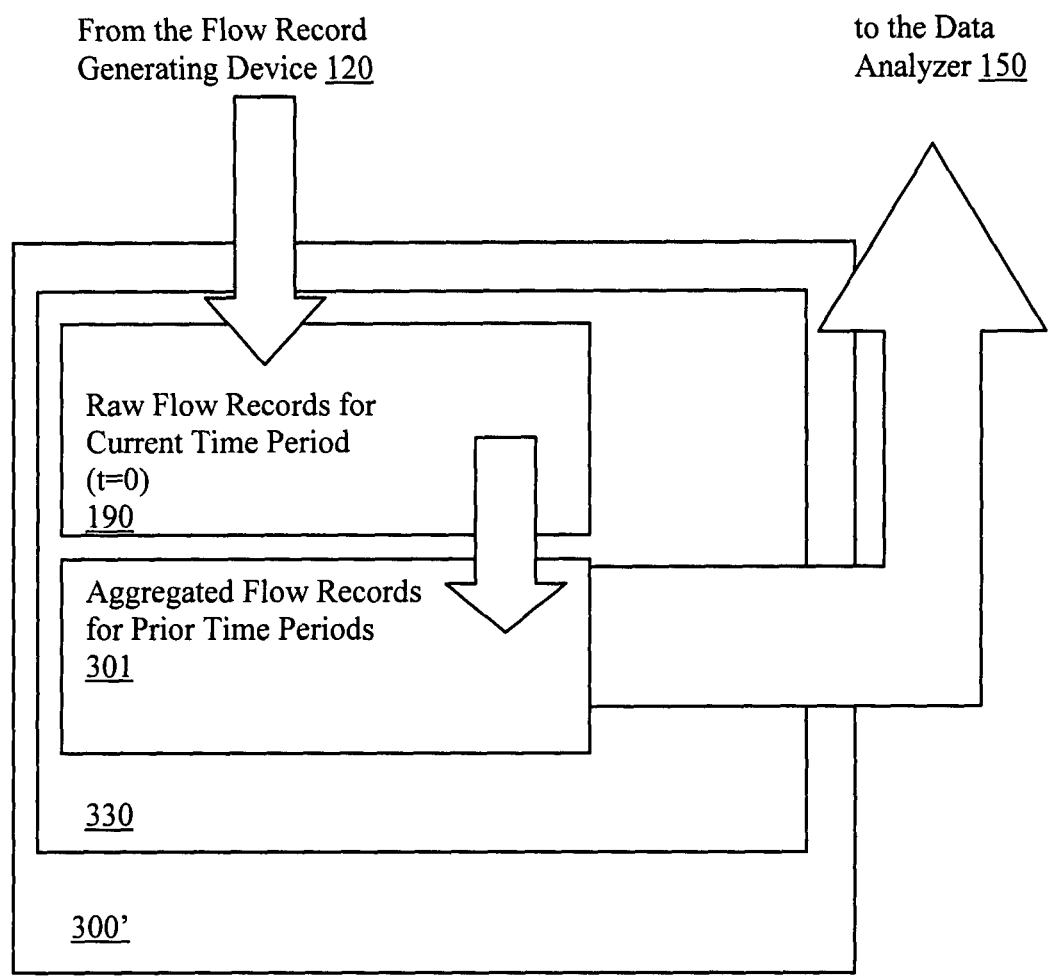

It should be appreciated that raw data table 310 and aggregated data table 320 may be a single table in the database 300. The single table that includes both the raw data table 310 and aggregated data table 320 will consequently have data entries for both the raw flow data 190 and the aggregated data 301. In particular, FIG. 3B depicts a database 300' in accordance with another embodiment of the present application. In this embodiment, the database 300; includes a composite table 330 the contains data entries for both the raw flow data 190 and the aggregated data 301. In operation, the composite table 330 typically operates by new raw flow data 190 being added according to conventional techniques. Following a certain trigger event, such as when a flow data record 190 exceeds a certain age, the information in that flow record is aggregated with data from other flow records to form the aggregated data 301. The aggregated data 301 may be formed as described above according to various criteria in the flow records.

The level of aggregation in the data 190 and 301 may be maintained by a field in that table 330. For example, a field added to the 190 data may have a null value to indicate that the data in not aggregated, whereas the same field in the aggregated records 301 may have a value to indicate that the flow data from two or more records 190 have been aggregated together. Referring to the example of database 300 in FIG. 3A, the field indicates aggregations. Alternatively, referring to the example of database 200 in FIG. 2, the field may include multiple values to identify the type of aggregation.

It should be further appreciated that the data may be organized and aggregated in the record storage 140 in different ways as needed. For example, referring to another embodiment of the present invention at FIG. 4. A database 400 includes multiple tables 410 and 420a-420n that divide the database 400.

In the depicted embodiment, the table 410 is the current time period and 420a-420n correspond to prior time periods of different duration that are typically non-overlapping. In the current time period, each of the new flow records 190 is stored in current table 410. When the flow records 190 in the current table 410 ages beyond a predefined threshold, which may be defined according to the storage and access needs of the system 100, the new flow records 190 are aggregated as desired as the aggregated flow data 401a that aggregates data for a previous time period corresponding to the duration that the current table 410 is used, and the current table 410 thereby becomes the first aggregated table 420a. A new current table 410 is created using the Data Definition Language (DDL) functions to store the new flow data 190. Likewise, each of the other aggregated tables 420b-420n contains, respectively, aggregated flow data 401b-401n for previous time periods b-n, where the duration of each of the time period is different from the duration of time period a and increases in duration. For example, FIG. 4 depicts an example where table 420a is in minutes, table 420b covers a period of hours, and table 420n covers a period of days.

Figure 4:
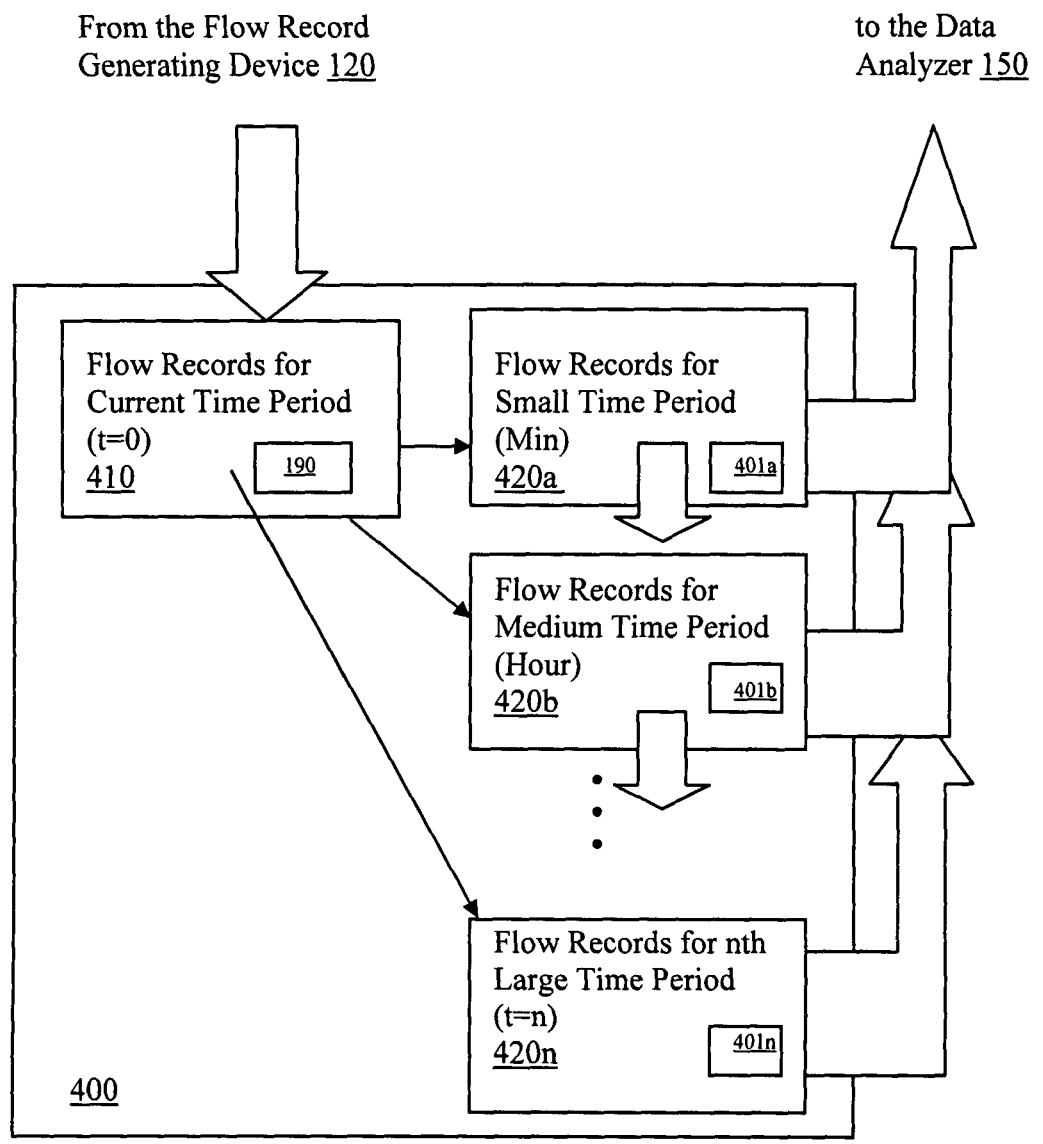

Continuing with FIG. 4, it can be seen that the Flow Record Generating Device 120 may again forward new flow records 190 in the current table 410. At the same time, the Data Analyzer 150 may access the aggregated data 401a-401n in each of the aggregated tables 420a-420n. In this way, data contention is again minimized. Furthermore, significant storage capacity is freed and analysis is greatly eased since the aggregated data 401a-401n is significantly smaller than the flow records 190. Thus, it can be seen that as data is aggregated at one level, such as at table 420a, the flow data is again re-aggregated at the next level, such at table 420b without a need to access and tie up the current table 410.

In the embodiment of FIG. 4, the lifespan of the aggregated tables 420a-420n depends on the respective time spans associated with each of the tables.

As described above, the embodiment depicted in FIG. 4 also describes the periodic aggregation and storage of the current flow records for n prior time periods of increasing duration. It should be appreciated that the duration of the time periods may be defined as needed to accomplish the goals of the data analysis system 100. For example, data may be aggregated every few minutes, hourly, daily, and monthly.

FIG. 4 generally depicts aggregation done in serial fashion, where data at one level is aggregated to the next higher level. While it is not depicted in FIG. 4, multiple aggregated tables 420a, may provide aggregated data 401a into a single aggregated table 420b of a higher aggregation period in a parallel fashion. For example, a separate aggregated table 420b may be kept for every hour of a day, and then those hourly aggregated table 420b may be aggregated into a single daily aggregated table 420c. Then, multiple daily aggregated tables 420c may be aggregated into a single weekly aggregated table 420d. Alternatively, an aggregated tables 420a may be forwarded to multiple aggregated tables 420b, 420c, 420d of larger aggregation periods. In this example, data may be kept, for example the last minute, the last hour, and the last day, where data is updated continuously or in real time.

While the invention has been described with reference to an exemplary embodiments various additions, deletions, substitutions, or other modifications may be made without departing from the spirit or scope of the invention. Accordingly, the invention is not to be considered as limited by the foregoing description, but is only limited by the scope of the appended claims.

What is claimed:

1. A system for aggregating network flow information, the system comprising:
   a flow generating device configured to generate flow records from network traffic and to export the flow records to a data collection server comprising a non-transitory storage device,
   the storage device comprising
      a raw data table comprising new flow records for a current time period; and
      a first aggregated data table comprising first aggregated flow records for a first prior time period and a second aggregated data table comprising second aggregated flow records for a second prior time period,
   wherein, when the new flow records age beyond a predefined threshold, the new flow records are aggregated in the same raw data table and the raw data table becomes an aggregated data table and a new raw data table is created in the storage device,
   wherein said current time period, said first prior time period, and said second prior time period do not overlap,
   wherein the new flow records are sampled prior to being aggregated, and wherein the sampled flow records comprise estimations of flow volume.

2. The system of claim 1, wherein said first prior time period and said second prior time period are of equal duration.

3. The system of claim 1, wherein said first prior time period has a first duration and said second prior time period has a second duration, and wherein the first prior time period is longer than the second prior time period.

4. The system of claim 1, further comprising a data analysis device, wherein said flow generating device is configured to concurrently provide the new flow records to the raw data table as the data analysis device accesses said first and second aggregated data tables.

5. The system of claim 1, further comprising an archival storage system that is configured to store raw flow record data for the first prior time period.

6. A method for aggregating network data flows, the method comprising:
   generating flow records from network traffic and exporting the flow records to a data collection server comprising a non-transitory storage device;
   storing new flow records for a current period of time in a raw data table of the storage device;
   storing, by the storage device, first flow records in a first table during a first prior period of time;
   aggregating said first flow records in said first table;
   after the first prior period of time and during a second prior period of time, creating a second table;
   storing, by the storage device, second flow records in the second table during the second prior period of time;
   aggregating said second flow records in said second table;
   sampling the new flow records, wherein the sampling comprises estimating flow volume from the new flow records; and
   when the new flow records age beyond a predefined threshold, aggregating the new flow records in the same raw data table and the raw data table becomes an aggregated data table and creating a new raw data table in the storage device;
   wherein said sampling further comprises sampling said first flow records prior to the aggregating of said first flow records in said first table;
   wherein said current period of time, said first prior period of time, and said second prior period of time do not overlap.

7. The method of claim 6, wherein said first prior period of time and said second prior period of time are of equal duration.

8. The method of claim 6, wherein said first prior period of time is longer than said second prior period of time.

9. The method of claim 6, wherein said storing of the second flow records in the second table and said aggregating said first flow records in said first table occur concurrently.

10. The method of claim 6, further comprising: archiving said first flow records and said second flow records; and compressing said archived first and second flow records.

* * * * *